(12) United States Patent
Castejon De La Encina

(10) Patent No.: US 11,280,665 B2
(45) Date of Patent: Mar. 22, 2022

(54) SMART BENCH FOR AMBULANCES

(71) Applicant: UNIVERSIDAD DE ALICANTE, Alicante (ES)

(72) Inventor: Maria Elena Castejon De La Encina, Alicante (ES)

(73) Assignee: UNIVERSIDAD DE ALICANTE, Alicante (ES)

( * ) Notice: Subject to any disclaimer, the term of this patent is extended or adjusted under 35 U.S.C. 154(b) by 139 days.

(21) Appl. No.: 16/472,674

(22) PCT Filed: Mar. 16, 2017

(86) PCT No.: PCT/ES2017/070150
§ 371 (c)(1),
(2) Date: Jun. 21, 2019

(87) PCT Pub. No.: WO2018/115544
PCT Pub. Date: Jun. 28, 2018

(65) Prior Publication Data
US 2019/0368918 A1    Dec. 5, 2019

(30) Foreign Application Priority Data
Dec. 23, 2016   (ES) .............................. ES201631678

(51) Int. Cl.
*G01G 19/40*    (2006.01)
*A61G 3/00*    (2006.01)
(Continued)

(52) U.S. Cl.
CPC ............. *G01G 19/40* (2013.01); *A61G 3/001* (2013.01); *G01G 19/445* (2013.01); *A61G 2203/20* (2013.01); *G01G 19/12* (2013.01)

(58) Field of Classification Search
CPC ...... G01G 19/12; G01G 19/40; G01G 19/445; A61G 3/001; A61G 2203/20
See application file for complete search history.

(56) References Cited

U.S. PATENT DOCUMENTS 4,363,368 A * 12/1982 Paddon ................ G01G 19/445
                                                              177/144
4,815,547 A *  3/1989 Dillon .................. G01G 3/1406
                                                              177/211
(Continued)

FOREIGN PATENT DOCUMENTS

| EP | 2 178 483 A2 | 4/2010 |
| JP | 63-201535 A | 8/1988 |
| JP | 2009-270902 A | 11/2009 |

OTHER PUBLICATIONS

International Search Report for PCT/ES2017/070150, dated Jul. 24, 2017.

*Primary Examiner* — Natalie Huls
(74) *Attorney, Agent, or Firm* — Sughrue Mion, PLLC

(57) ABSTRACT

The invention relates to a bench with a scales function, which comprises sensors disposed in parallel along lower lateral bars of the bench and connected to a digital transmitter that transmits to a screen by means of a cable or Bluetooth. In addition to the current functions of the platforms to which the beds are anchored in the vehicles, the bench with an electronic scales function provides the exact value of the weight of the patient, in real time, facilitating the calculation of the precise doses of drugs, fluids, etc.

13 Claims, 2 Drawing Sheets

(51) Int. Cl.
    *G01G 19/44*    (2006.01)
    *G01G 19/12*    (2006.01)

(56) References Cited

U.S. PATENT DOCUMENTS

| | | | | |
|---|---|---|---|---|
| 4,957,177 A * | 9/1990 | Hamilton | ............ | G01G 3/1412 |
| | | | | 177/179 |
| 5,319,817 A * | 6/1994 | Hay | ................ | A61G 7/1019 |
| | | | | 16/327 |
| 6,093,895 A * | 7/2000 | Niosi | ................ | G01G 23/3728 |
| | | | | 177/136 |
| 6,242,701 B1 * | 6/2001 | Breed | ................ | B60N 2/002 |
| | | | | 177/144 |
| 7,199,311 B1 * | 4/2007 | Buckner, Jr | ............ | A61G 1/04 |
| | | | | 177/144 |
| 8,698,014 B1 * | 4/2014 | Walstad | ................ | G01G 19/44 |
| | | | | 177/126 |
| 8,892,203 B2 * | 11/2014 | Heinrichs | ............ | G01G 19/445 |
| | | | | 607/6 |
| 9,766,116 B2 * | 9/2017 | Milne | ................ | G01G 19/44 |
| 10,768,040 B2 * | 9/2020 | Taylor | ................ | A61G 7/103 |
| 2006/0129047 A1 | 6/2006 | Ruotoistenmaki | | |
| 2009/0051549 A1 * | 2/2009 | Tochigi | ................ | G01G 19/445 |
| | | | | 340/573.4 |
| 2015/0122555 A1 * | 5/2015 | Meeks | ................ | G01G 19/44 |
| | | | | 177/126 |

\* cited by examiner

SMART BENCH FOR AMBULANCES

CROSS REFERENCE TO RELATED APPLICATIONS

This application is a National Stage of International Application No. PCT/ES2017/070150 filed Mar. 16, 2017, claiming priority based on Spanish Patent Application No. P201631678, filed Dec. 23, 2016.

FIELD OF THE INVENTION

The present invention relates to a bench for land or air medical assistance vehicles in the area of pre-hospital emergencies, and in addition to the functions present on the market today, the present bench works like an electronic scale which allows weighing the patient to know the exact information concerning their weight, reducing adverse events caused by the inexact calculation of the doses of drugs, dilutions, fluid therapy, etc.

PRIOR ART

Today, critical patients are transported in the interior of medical ambulances on a bed housed in a bench, located on the floor of the vehicle. These are longitudinal platforms which facilitate the anchoring of the bed, with the patient lying on it, to the chassis of the medical vehicle to prevent the movement thereof during travel. They additionally have other functions, such as allowing lateral movement, to facilitate the mobility of medical personnel around the patient, as well as the possibility of disposing the individual in different therapeutic positions, i.e., Fowler, Trendelenburg, etc., and at different heights to allow medical professionals to perform diagnostic and therapeutic procedures on the patient. These functions are based on hydraulic and electrical systems.

The characteristics of these structures today must comply with the following regulations in force:
  Royal Decree 22/2014 of 17 January, whereby amending Royal Decree 836/2012 of 25 May, which establishes the technical features, the medical equipment, and the personnel involved in vehicles for roadway medical transport.
  European Standard UNE-EN 1789:2007+A2:2015.

Moreover, the clinical safety culture for providing medical assistance free of adverse events is being developed today in the Pre-hospital Medical Emergency Services. One of the resources for performing clinically safe assistance work in this field is the implementation of new devices which facilitate the prevention of adverse events.

One of the risks detected is the possible error in the calculation of the doses of drugs and fluid therapy used in stabilizing both pediatric and adult critical patients, as well as the invasive mechanical ventilation parameters and amount of energy to be administered in Joules in the case of the defibrillation in children in cardiopulmonary arrest. To that end, it is necessary to know the exact weight of the patient since it is indispensable in the calculation formula.

Today, the weight of the patient is subjectively estimated, which considerably increases the risk priority number if a modal analysis of failures and events were to be conducted, since the medicinal products and therapeutic maneuvers present a wide range of undesirable effects resulting from an error in the dose.

DISCLOSURE OF THE INVENTION

The objective of this invention is to increase the clinical safety of critical patients receiving assistance from the medical assistance units in the area of pre-hospital care (patients with multiple trauma injuries, burn victims, patients in shock, patients requiring emergency endotracheal intubation, non-shockable rhythms in children in cardiopulmonary arrest, etc.), reducing the adverse events caused by the excess or defect in the calculation of doses of pharmaceutical presentations and therapeutic procedures. To that end, in addition to the current functions of the platforms to which the beds are anchored in the vehicles, a bench with an electronic scales function is designed which provides the exact value of the weight of the patient, in real time, facilitating the calculation of the precise doses of drugs, fluids, etc.

This new bench design comprises sensors which detect the weight of the patient, acting like an electronic scale and disregarding the weight of the bed which acts as a constant. Furthermore, this bench incorporates an electronic device which displays the values calculated in a customized manner for the patient. The bench also comprises a digital transmitter which interconnects the sensors to one another and is connected at the same time to the electronic device.

The system must be resistant to vibrations given its use in a vehicle intended for both the assistance and the transfer of people.

In this sense, the sensors are digital load cells calculating the exact weight of the patient and allowing suitable administration customized for each patient in particular. Said load cells have the capacity to detect a range of weights from 10 to 150 kilograms (pounds in the English measurement system) for pediatric up to adult patients, excluding newborns and infants transported in incubators.

Furthermore, the electronic device is a screen which displays the parameters calculated for the patient in particular. Thus, the design can incorporate two screen versions.
  Basic functional design: bench with a scales function with LED screen incorporated on the side of the bench, connected to the digital transmitter by means of a cable which only expresses the value of the weight of the patient.
  Advanced assistance design: bench with a scales function connected to a mobile device by means of Bluetooth, with a touch screen and with a magnetic element for being able to place it in any work area of the vehicle, and which displays the exact calculation of the doses of the drugs, fluids, or other parameters, according to the weight of the patient, as a result of built-in software.

The advantages provided by this new bench design are:
  It calculates the exact dose of drugs and dilution preparation, taking into account the weight of the patient (for example, calculation of fibrinolytics, calculation of antidotes, doses of inotropic drugs, doses of rapid sequence intubation drugs, analgesics, corticoids, etc.).
  It calculates the exact dose of fluids, taking into account the weight of the patient (for example, Parkland formula in burn patients, hypertonic saline solution, mannitol, etc.).
  It calculates the parameters for invasive mechanical ventilation.
  It calculates the energy in Joules to be administered to children in the cardiac defibrillation in cases of cardiopulmonary arrest.

Initial therapeutic assistance of critical patients is thereby favored, reducing the unwanted side effects due to the approximate calculation of the doses of these drugs or therapies.

The present invention therefore relates to a bench for the anchoring of beds in land or air medical assistance vehicles in the area of pre-hospitalization emergencies which works like an electronic scale providing the weight of the patient calculated in real time.

BRIEF DESCRIPTION OF THE DRAWINGS

For the purpose of facilitating the disclosure, figures illustrating the invention by way of example have been included, without limiting the scope of the present invention.

DETAILED DISCLOSURE OF THE EMBODIMENTS

The bench, with dimensions 182×58×3 cm, is characterized by comprising at least two digital load cells interconnected by means of the digital transmitter, which is furthermore connected to the digital screen either by means of a cable or Bluetooth.

In a particular embodiment, the load cells are leak-tight, hermetically encapsulated, and made of stainless steel.

In a particular embodiment, the bench comprises six load cells disposed in parallel along lower lateral bars of the bench.

In a particular embodiment, the load cells and the digital transmitter are protected by a metal sheet 7 at least 2 mm thick covering the lower part of the bench longitudinally.

In a particular embodiment, in the basic design, the bench comprises a LED screen, incorporated on the side of the bench, connected by cable to the digital transmitter to display the weight in kilograms and grams (International Measurement System) or pounds (English Measurement System).

In a particular embodiment, the bench comprises a screen with a display with an external magnetic element 8 which is connected to the digital transmitter by means of Bluetooth and which shows the exact calculation, by means of a programmed software, of the doses of the drugs, fluids, invasive mechanical ventilation parameters, amount of energy, etc. according to the weight of the patient and the age group (pediatric, adult). The screen is tough sensitive, with dimensions of 30×30×5 cm, and has a Bluetooth receiver, with LED lighting. It comprises a background with two colors, depending on the age of the patient, which is split into two sections: the section on the right is reserved for adults, and the section on the left is reserved for the pediatric population, selected by the medical professionals once the weight of the patient is obtained. When 20 the software is run, the results are displayed in doses of drugs, dilutions, etc., with the calculation having already been made based on this parameter. It is also possible not to use the software if the medical professional does not need it; therefore the weight has a space reserved on the display, regardless of the age of the patient. The weight is displayed in kilograms or pounds, according to the type of measurement.

In addition to the screen, the electronic device comprises two buttons arranged on both sides thereof, the calibration button 3 and the weight button 4. When the bed is lowered from the platform to pick up the patient, the calibration button 3 is pressed, and when the vehicle returns with the patient, the bed is placed on the bench, anchoring it to the chassis of the vehicle. Once secured, the weight button 4 is pressed to obtain the weight in real time, disregarding the weight of the bed which acts as a constant.

Figure 1:
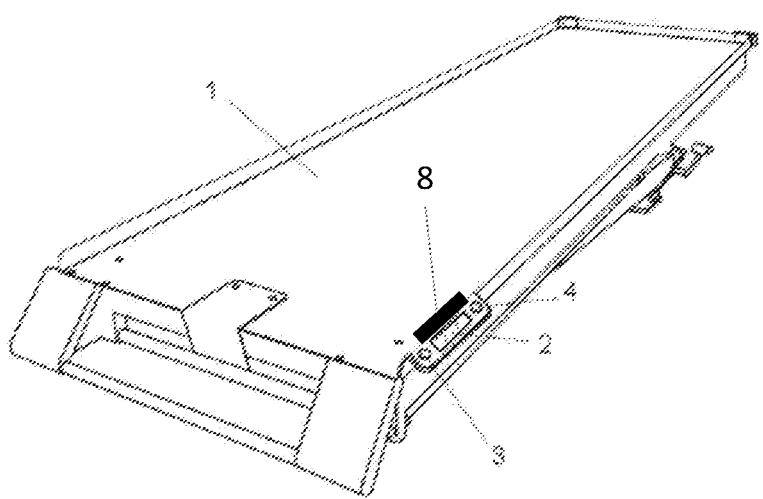
FIG. 1 shows a schematic view of the bench in the electronic scale position without a bed, i.e., basic functional design.

FIG. 1 shows a schematic view of the bench in the electronic scale position without a bed, in its basic functional design. The bench is in scale position 1, understanding that the patient is on the bed already anchored to the structure. The basic display 2 of the scale has dimensions of 10×3×2 cm, and it is a flat, non-touch LED screen with a blue background to facilitate seeing it at night as well, with large-sized numbers for easy viewing thereof. It is arranged on the side of the bench to prevent impacts and risks for the medical personnel when accessing the interior of the vehicle where assistance is provided.

Figure 2:
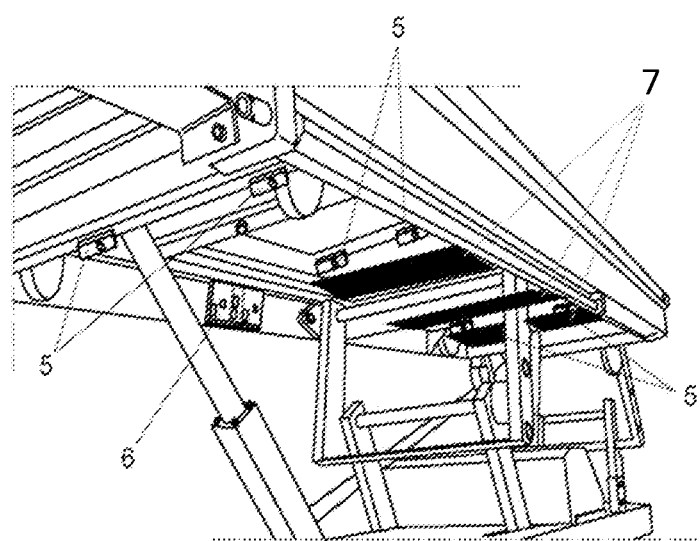
FIG. 2 shows a schematic view of the lower part of the bench with the distribution of the load cells and digital transmitter.

FIG. 2 shows the schematic view of the bench with a scales function. In this case, six load cells with digital sensors 5 connected to the digital transmitter 6, and the latter connected to the screen, have been arranged.

An example of emergency assistance to a patient with multiple trauma injuries after a traffic accident, who was hit on a public thoroughfare, is described below. Upon immobilization, the patient is disposed on the bed, then the bench is calibrated and the bed with the patient on it is anchored. The victim is weighed, with a result of 25 kilograms (disregarding the weight of the bed), 9-year old female.

With a basic design of the bench, the doses of drugs could be calculated manually. With the advanced assistance design, the "Pediatrics" section is selected and the design automatically provides the doses of analgesics, fluids, etc.:

Ketamine: 37.5 mg (1.5 mg/kg)
Fentanyl: 75 mcg (3 mcg/kg)
Crystalloids: 500 mL bolus in state of shock (20 ml/kg)
Rocuronium: 15 mg in rapid sequence intubation. (0.6 mg/kg)
Midazolam: 7.5 mg (0.3 mg/kg)
Parkland formula: 100 ml (4 ml/kg)×% burned body surface area of Ringer's lactate solution, half being administered in the first 8 hours.

The invention claimed is:

1. A vehicle for providing medical assistance to a patient, comprising,
a floor;
a smart bench fixed to the floor of the vehicle and configured to removably anchor a patient stretcher, the bench comprising at least two digital load cells, an electronic device displaying load information, and a digital transmitter which interconnects the load cells to one another and to the electronic device.

2. The vehicle according to claim 1, wherein the load cells are leak-tight, hermetically encapsulated and made of stainless steel.

3. The vehicle according to claim 1, wherein said bench comprises six load cells disposed in parallel along lower lateral bars of the bench.

4. The vehicle according to claim 1, wherein the load cells and the digital transmitter are protected by a metal sheet at least 2 mm thick covering the lower part of the bench longitudinally.

5. The vehicle according to claim 1, wherein the electronic device comprises a LED screen incorporated on the side of the bench and connected by cable to the digital transmitter to display the weight in kilograms and grams or pounds.

6. The vehicle according to claim 5, wherein the electronic device comprises two buttons, one for calibration and one for weight.

7. The vehicle according to claim 1, wherein the electronic device comprises a touch screen with a display with an external magnetic element to removably secure the touch screen to a metal surface, the touch screen is connected to the digital transmitter by means of Bluetooth.

8. The vehicle according to claim 1, wherein the electronic device comprises a touch screen with a display with an external magnetic element to removably secure the touch screen to a metal surface, the touch screen is connected to the digital transmitter by means of Bluetooth which shows a calculation performed by a programmed software of at least one of doses of drugs and fluids, invasive mechanical ventilation parameters, or amount of energy, the calculation based on the weight of the patient.

9. The vehicle according to claim 1, wherein the electronic device comprises a touch screen with a display with an external magnetic element to removably secure the touch screen to a metal surface, the touch screen is in wireless communication with the digital transmitter and shows a calculation performed by a programmed software of doses of drugs and fluids, invasive mechanical ventilation parameters, or amount of energy, the calculation based on the weight and age group of the patient.

10. The vehicle according to claim 1, wherein the electronic device comprises a touch screen with a display with an external magnetic element to removably secure the touch screen to a metal surface, the touch screen is in wireless communication with the digital transmitter.

11. The vehicle according to claim 1, wherein the electronic device comprises a touch screen with a display with an external magnetic element to removably secure the touch screen to a metal surface, the touch screen is in wireless communication with the digital transmitter and shows a calculation of a clinical parameter performed by a programmed software based on a weight of the patient.

12. The vehicle according to claim 1, wherein the electronic device comprises a touch screen with a display with an external magnetic element to removably secure the touch screen to a metal surface, the touch screen is in wireless communication with the digital transmitter and shows a calculation of a clinical parameter performed by a programmed software based on a weight of the patient and an age group of the patient.

13. The vehicle according to claim 1, wherein the bench is configured to be raised and lowered relative to the floor of the vehicle while remaining fixed to the floor of the vehicle.

\* \* \* \* \*